Figure 1:
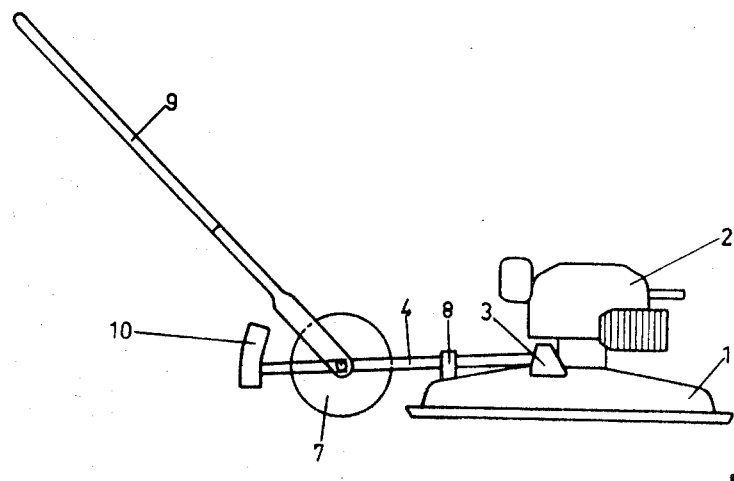

United States Patent

[11] 3,589,113

| [72] | Inventor | Ernst Sture Lennart Svensson<br>Malmo, Sweden |
|---|---|---|
| [21] | Appl. No. | 876,700 |
| [22] | Filed | Nov. 14, 1969 |
| [45] | Patented | June 29, 1971 |
| [73] | Assignee | Flymo Societe Anonyme<br>Geneva, Switzerland |
| [32] | Priority | Nov. 21, 1968 |
| [33] | | Great Britain |
| [31] | | 55190/68 |

[54] DEVICE FOR STEERING AN AIR CUSHION SUPPORTED LAWN MOWER
5 Claims, 2 Drawing Figs.

[52] U.S. Cl. .................................................... 56/12.8, 180/119
[51] Int. Cl. ..................................................... A01d 35/26
[50] Field of Search ........................................... 56/12.8, 180/119

[56] References Cited
UNITED STATES PATENTS

| 3,320,731 | 5/1967 | Cody et al. ................. | 56/25.4 GE |
| 3,400,523 | 9/1968 | Klingofstrom et al. ...... | 56/25.4 GE |
| 3,423,912 | 1/1969 | Heth ........................... | 56/25.4 GE |

Primary Examiner—Antonio F. Guida
Attorney—Laurence R. Brown

ABSTRACT: A lawnmower of the kind having a rotary blade and a blower supporting the housing above the ground on a cushion of air is provided with a handle coupled to the housing by means of a pivotable linkage and a wheel resting upon the ground in such a manner that the distance of the mower above the ground is determined by the blower and not by forces acting upon the handle.

PATENTED JUN29 1971  3,589,113

INVENTOR
Ernst Sture Lennart Svensson

BY Laurence R Brown
ATTORNEY

DEVICE FOR STEERING AN AIR CUSHION SUPPORTED LAWN MOWER

This invention relates to a device for use in manually moving and steering a lawnmower of the kind which in operation is supported by a cushion of air below a mower housing.

Normally this kind of mower will tend to operate with a substantially constant gap between the mower housing and the ground, but a clumsy operator pushing or pulling too forcefully upon a handle which is pivotally attached directly or through rigid brackets to the housing can cause variations in the said gap and undesired variations in the cutting height, particularly upon an uneven lawn.

The present invention is therefore intended to provide a device for use in manually moving and steering an air supported lawnmower to facilitate improved mowing of uneven lawns.

According to the invention there is provided a device for use in manually moving and steering an air-supported lawnmower which comprises at least one link for pivotal connection to the mower housing, at least one wheel adapted to run on the ground and mounted for rotation on an axle carried by the link, and a handle pivotally attached to the link for limited rotational motion about the axis of rotation of the wheel for steering and moving the device and the mower. These elements are so arranged that when the device is in use with the mower in operation, the said wheel can run on the ground outside the area covered by the housing and no forces tending to urge the mower downwards can be transmitted from the said handle to the mower, whereas by manually depressing the said handle sufficiently the mower can be raised both when the mower is out of operation and when the mower is in operation.

Figure 2:
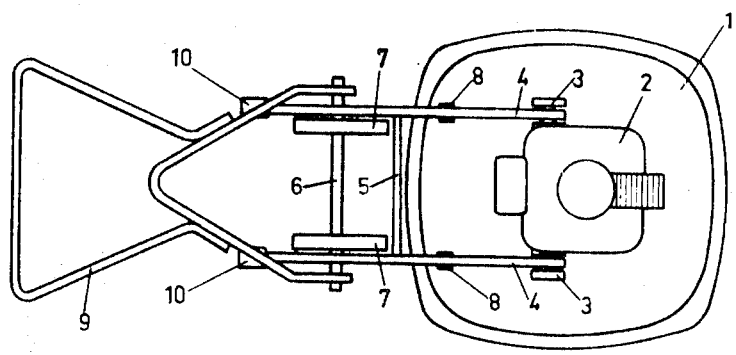

The invention is further described below with reference to the accompanying drawings, in which by way of example:

FIG. 1 is a side elevation showing a device provided in accordance with the invention in combination with an air-supported lawnmower, and FIG. 2 is a plan view corresponding to FIG. 1.

The drawings illustrate an air-supported lawnmower, comprising a mower housing 1 and an internal combustion engine 2. A pair of brackets 3 is positioned on the housing. A conventional handle (not shown) to serve for manually moving and steering the mower could be pivotably attached to the brackets 3.

The drawings further illustrate in combination with the said mower a device in accordance with the invention. The said device comprises two parallel links 4 which are rigidly interconnected with each other by a crossbar 5 and are equal in length to each other. The links 4 are pivotally connected to the mower housing 1 by means of the brackets 3. Two wheels 7 equal in diameter to each other are mounted for rotation on an axle 6 which is transverse to and carried by the links 4. A handle 9 is pivotally attached to the links 4 for limited rotational motion about axle 6 and therefore the axis of rotation of the wheels 7 to manually steer and move the mower. On the links 4 are respective buffer stops 10 for limiting counterclockwise rotational motion of the handle 9 about axle 6, and buffer stops 8 for limiting clockwise rotational motion of the mower housing about brackets 3, as viewed in FIG. 1.

As may be readily appreciated from FIG. 1, the arrangement is such that when the device is in use with the mower in operation the wheels 7 can run on the ground outside the area covered by the housing 1 and no forces tending to urge the mower downwards can be transmitted from the handle 9 to the mower. If an uneven lawn or long grass offers resistance to horizontal movement of the mower extra force for moving and steering the mower can be exerted through the handle 9 without changing the cutting height.

However by manually depressing the handle 9 sufficiently, that is to say by turning the handle 9 counterclockwise about the axis of rotation of the wheels 7 as viewed in FIG. 1, the handle 9 can be brought into contact with the stops 10 to cause the links 4 to turn about the axle 6 of the wheels 7 so that the mower can be raised and easily moved horizontally both when the mower is out of operation and when the mower is in operation.

Various modifications may be made; for example, a fuel tank and a grass-collecting receptacle may be mounted on the handle 9 so that changes in the weights of their contents will not affect the cutting height. Although the illustrated construction is preferred, it would be possible to employ only a single link and a single wheel disposed substantially in a vertical plane of symmetry passed through the mower.

What I claim is:

1. A device for use in manually moving and steering an air-supported lawnmower, comprising in combination; a housing, at least one link for pivotal connection to the said housing, an axle carried by said link, at least one wheel adapted to run on the ground outside said housing and mounted for rotation on said axle carried by the link, a handle pivotally attached to the link about the axis of rotation of the wheel for limited rotational motion, all so arranged that when the device is in use with the mower in operation the said wheel can run on the ground outside the area covered by the housing and no forces tending to urge the mower downwards can be transmitted from the said handle to the mower, and means whereby manually depressing the said handle sufficiently so that the mower can be raised both when the mower is out of operation and when the mower is in operation.

2. A device according to claim 1, wherein the last-mentioned means comprises a stop for limiting the angular displacement of the said handle relative to the link so that by manually depressing the handle sufficiently forces for raising the mower can be transmitted from the handle through the link to the mower about the axis of rotation of said wheel.

3. A device according to claim 1, wherein two wheels of equal diameter are disposed on said axle.

4. A device according to claim 1, wherein said link has two parallel portions which are rigidly interconnected with and equal in length to each other.

5. A combination comprising, an air-supported lawnmower with a housing, a wheel supported pivotably on said housing to be disposed on the ground outside the area covered by said housing, and handle means for manipulating said lawnmower mounted to bear upon said wheel as it rests upon the ground.